(12) United States Patent
Fenny et al.

(10) Patent No.: US 6,254,037 B1
(45) Date of Patent: Jul. 3, 2001

(54) VARIABLE GRADIENT CONTROL STICK FORCE FEEL ADJUSTMENT SYSTEM

(75) Inventors: Carlos Alexander Fenny, Arlington; Peter Marcus Shultz, Ft. Worth, both of TX (US)

(73) Assignee: Bell Helicopter TEXTRON Inc., Fort Worth, TX (US)

( * ) Notice: Subject to any disclaimer, the term of this patent is extended or adjusted under 35 U.S.C. 154(b) by 0 days.

(21) Appl. No.: 09/369,948

(22) Filed: Aug. 6, 1999

(51) Int. Cl.[7] .................................................. B64C 13/14
(52) U.S. Cl. ............................................ 244/223; 244/221
(58) Field of Search .................................. 244/223, 221, 244/220; 434/45

(56) References Cited

U.S. PATENT DOCUMENTS

| | | | |
|---|---|---|---|
| 2,702,168 | 2/1955 | Platt | 244/7 |
| 2,835,461 | 5/1958 | Westbury et al. | 244/83 |
| 3,117,745 | 1/1964 | Ellis, III et al. | 244/7 |
| 3,514,052 | 5/1970 | McKeown | 244/7 |
| 3,584,814 | 6/1971 | Murphy | 244/77 |
| 3,733,039 | 5/1973 | O'Connor et al. | 244/77 |
| 3,747,876 | 7/1973 | Fortna et al. | 244/83 D |
| 3,960,348 | 6/1976 | Fowler et al. | 244/17 |
| 4,008,979 | 2/1977 | Cooper et al. | 416/40 |
| 4,088,284 | 5/1978 | Caswell | 244/7 |
| 4,127,245 | 11/1978 | Tefft et al. | 244/17 |
| 4,168,045 | 9/1979 | Wright et al. | 244/17 |
| 4,664,346 | 5/1987 | Koenig | 244/223 |
| 4,697,986 | 10/1987 | David | 416/114 |
| 4,958,786 | 9/1990 | Ogawa et al. | 244/17 |
| 5,265,826 | 11/1993 | Ebert et al. | 244/17 |

Primary Examiner—Charles T. Jordan
Assistant Examiner—Judith A. Nelson
(74) Attorney, Agent, or Firm—Gardere Wynee Sewell LLP; Sanford E. Warren, Jr.; J. Russell Holloway

(57) ABSTRACT

A variable gradient control stick force feel adjustment system for use in aircraft is disclosed. A gradient actuator is operationally coupled to at least one spring cartridge assembly in order to move the pivot point of the spring cartridge assembly with respect to the aircraft's directional hardware so that the tension of at least one manual control stick onboard the aircraft can be adjusted. At least one operational parameter input is provided to the gradient actuator from at least one of the aircraft's onboard control devices in order to effect a change in pivot point for the spring cartridge assembly.

15 Claims, 3 Drawing Sheets

VARIABLE GRADIENT CONTROL STICK FORCE FEEL ADJUSTMENT SYSTEM

TECHNICAL FIELD OF THE INVENTION

The present invention is directed to the field of control stick force adjustment systems as used in aircraft and, more particularly, to an improved variable gradient control stick force feel adjustment system.

BACKGROUND OF THE INVENTION

Control stick force adjustment systems are used in the aircraft aviation field to provide pilots with a better "feel" and control over their aircraft by adjusting the tension of the manual control system (e.g, control stick, cyclic stick, steering, peddles, etc.,) at varying air speeds. For example, In a conventional force trim mechanism for a helicopter cyclic system, only a fixed force gradient is provided. In simple terms, for every increment of cyclic displacement, the pilot feels a proportional force. It is of course desirable that a certain amount of force is encountered in any direction a pilot moves the controller (be it left or right, forward or backward). Force on a cyclic stick provides the pilot, and ultimately the aircraft, with stability during airborne operations. The force, typically, is generated by a four bar linkage that compresses or extends a spring cartridge. Two linkage assemblies are utilized, one for lateral motion and another for longitudinal motion. By moving the spring cartridge grounding points, the position where the pilot using the cyclic stick feels zero force can be moved. Actuators called Force Trim Actuators are also used to move the spring cartridge grounding points. Because the linkages of the conventional lateral or longitudinal force trim system move in a fixed plane, these linkages are considered two-dimensional.

It should be appreciated that the force encountered in the typical helicopter operation is a substantially linear relationship. When operating an airplane, however, a pilot normally encounters a much stiffer control stick because a much higher spring force is required as the aircraft travels at higher airspeeds. Instead of moving the stick forward and backward, or the steering assembly left or right, with a normal force of one pound per inch, a pilot should encounter approximately 3 pounds per inch. Without the additional force, an aircraft flying at high speeds could undergo very erratic and dangerous aircraft movement.

Many prior controller force adjustment systems utilize electric motors to place a higher torque on the control stick, resulting in a higher tensioned feel. Although the force trim systems for some aircraft incorporate a spring tension against any force exerted by the pilot against the pilot-controlled directional gear, automated control is the predominant technology in later model aircraft. For example, in current tilt rotor aircraft applications, a variable force field actuator takes a given parameter (e.g., tilt rotor position or airspeed) and uses an electric motor to in-turn cause an increasing or decreasing force against the pilot-controlled directional system, based on inputs to the electric motor by a controller. Such a system is not only heavy but also very expensive because of the electronics in controlling the motor and the redundancy that may be required with automated systems in order to safeguard against potential system failures.

Many problems in achieving variable tension on manual controllers are unique to a tilt rotor aircraft because it functions as both an airplane and a helicopter. Because a tilt rotor aircraft operates as both, it is desirable to have the feel of the tilt rotor aircraft change as it is converted from an airplane to a helicopter, and vice a versa, during flight. The way that the "feel" and resulting handling capabilities are accomplished currently in tilt rotor aircraft systems (such as the Bell XV15 and the V22 tilt rotor aircraft), is to use the heavier, more expensive variable force field actuator systems, as described above. It would be more desirable in tilt rotor aircraft applications, and for the aircraft industry as a whole, to have access to a less complicated, lighter and more reliable variable gradient cyclic force feel system, such as disclosed in the present invention.

SUMMARY OF THE INVENTION

According to a broad aspect of one preferred embodiment of the present invention, a mechanically-based variable gradient force adjustment system utilizes a gradient actuator to move the pivot point of at least one spring cartridge so that the manual control stick on an aircraft can be set at a different position with respect to the aircraft-embedded directional hardware, resulting in an enhanced feel and control.

In accordance with one embodiment of the present invention, a variable gradient control stick force feel adjustment apparatus is provided, which comprises a gradient actuator operationally coupled to at least one spring cartridge assembly to move the pivot point of the at least one spring cartridge with respect to an aircraft's onboard directional hardware so that the tension of at least one manual control stick for the aircraft can be adjusted.

BRIEF DESCRIPTION OF THE DRAWINGS

The foregoing and other objects, aspects and advantages are better understood from the following detailed description of a preferred embodiment of the invention with reference to the drawings, in which.

DETAILED DESCRIPTION OF THE INVENTION

One preferred embodiment of a system in accordance with the present invention is practiced with the lateral and longitudinalitudinal pilot-actuated control system for a tilt rotor aircraft. The operation of a standard force trim system in a tilt rotor aircraft will first be generally discussed in order to provide a frame of reference to compare the benefits of the invention. It should be understood from the teachings of the invention that it can be applied generally to all manual control stick system across the entire aircraft industry. For purposes of this description, the terms "control stick" or "stick" are meant to generically apply to manual control systems (e.g, control sticks, cyclic, steering mechanisms, etc.) commonly found in the aircraft (helicopter, airplane and tilt rotor aircraft) industry.

If a pilot took the control stick in a conventional force trim helicopter system and moved it one inch, he would encounter about one pound of force. If the pilot moved the same control stick 2 inches, he would encounter about 2 pounds of force. The same force would be encountered in either left or right movement of the stick. If the pilot is flying a standard airplane and moved the control stick therein either forward or backward one inch, he would encounter about 2 pounds per inch of force. If the control stick were moved 2 inches, he would encounter 3–4 pounds per square inch of force. In a conventional airplane, the pilot is encountering about 2 pounds of force for every inch of controller movement. In a helicopter, however, the force per square inch relationship is much more linear.

When a pilot flies in a airplane, he desires a much stiffer feel over the control stick controller than in a helicopter. The same high tension force is not be desirable in a helicopter where faster movement and mechanical response is desired. A tilt rotor aircraft requires the ability to do both in order to have variable force. Rather than solely using an electric motor to artificially place a higher torque on the controller, resulting in a higher-tensioned feel, the present invention uses a variable gradient actuator in combination with a three-dimensional phasing linkage to cause a moment arm on which the typical spring cartridge mechanism is attached to change its distance with respect to the Latitudinal/Longitudinal adjustment mechanism for the aircraft and stick. Based on the simple engineering principle "moment is equal to force times length a moment of one foot pound is equal to one foot moment arm times one pound of force", instead of changing the force on the stick electronically through motors, a mechanical variance in the moment arm relationship to the directional hardware and/or pilot control mechanism is changed.

Figure 1:
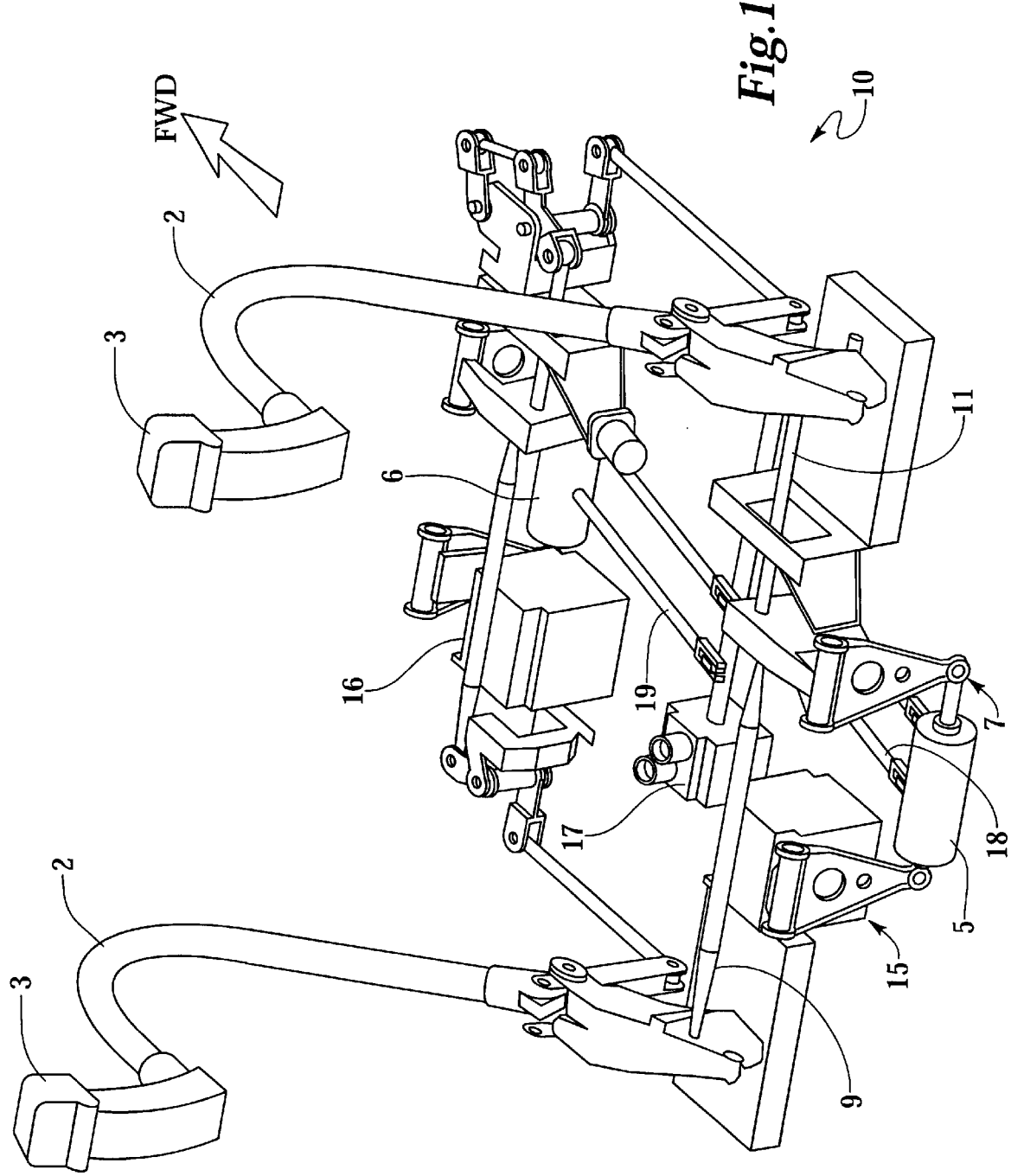
FIG. 1 is a perspective view of a cyclic control stick mechanism for a helicopter incorporating the variable gradient control system of the present invention.

Referring to FIG. 1, a perspective view of the pilot operated section of the latitudinal and longitudinal control system 10 in an aircraft incorporating the force feel adjustment improvement of the present invention is illustrated. The system 10 includes two spring cartridges, a lateral spring cartridge 5 and a longitudinal spring cartridge 6. The lateral spring cartridge 5 is tied to the control sticks 2, and controls the lateral motion of the sticks 2 (side to side motion). Through an additional linkage, the sticks 2 are tied to the longitudinal spring cartridge 6, which provides longitudinal motion (forward and back motion) to the sticks 2. From the perspective view of the Figure, it can be seen that lateral spring cartridge 5 is attached to a bell crank 7 that is linked at 9 and 10 to the sticks 2 for lateral motion. The spring cartridge's 5 opposite end, or what is referred to as ground end, is attached to a lateral trim actuator 15. The lateral trim actuator 15 may allow a pilot to reset to zero, or neutral force, the sticks 2 position by using a beep switch 3 located on the sticks 2. Reset causes the bell crank 7 on the actuator 15 to move, changing the systems zero point. As the bell crank 7 moves, the sticks 2 move along with it such that a new zero point would be achieved. The same is true for longitudinal functions. From the Figure, it can be seen that the longitudinal spring cartridge 6 is also associated with a longitudinal trim actuator 16. The longitudinal spring cartridge 6 and longitudinal trim actuator are linked with the sticks 2 and associated with the beep switch 3, as indicated above.

The actuators 15, 16 have a clutch (not shown), which controls, or clutches, the movement of each associated bell crank in and out. No spring force is required at all in some flight modes such as helicopter applications, which require very responsive stick action for precise aircraft motion. In such an application, the bell cranks are actually declutched, allowing the sticks 2, 3 to move together against minimal force. Free motion, however, is completely unacceptable for a tilt rotor aircraft operating in airplane mode because a small cyclic reflection could cause very dramatic aircraft motion. The clutch for each actuator must therefore be disabled in airplane mode.

For a control stick system to meet the requirements of the tilt rotor, it must have a control stick force that increases with increased speed when converting from helicopter to airplane (otherwise known as a variable gradient force). The invention, through the linkage arrangement described herein, changes the moment arm length of the lateral and longitudinal springs 5, 6 through a gradient actuator 17 and linkage arrangement 18, 19 to the lateral and longitudinal springs 5, 6, respectively.

Figure 2:
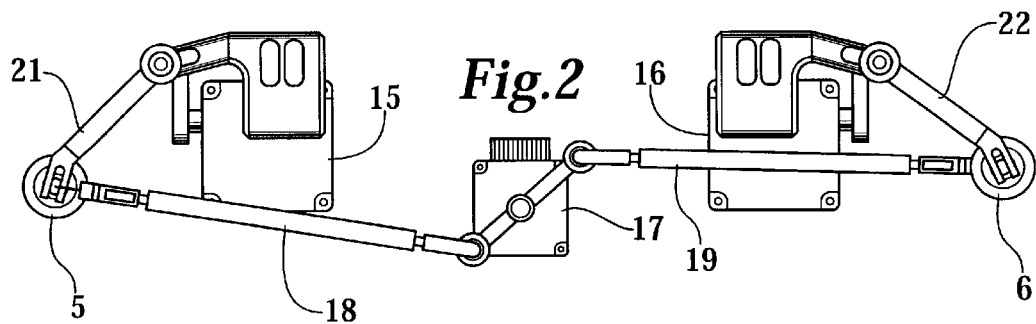
FIG. 2 is a plan view of the position of the gradient actuator, linkages and moments arms when the aircraft is in helicopter mode.

Referring to FIG. 2, what is illustrated is a plan view of the gradient actuator 17 and its associated linkages 18, 19 to the lateral 5 and longitudinal 6 springs. The moment arm 21 for the roll, or lateral, axis (or lateral setting) is approximately 2.2 inches in Helicopter mode. The moment arm 22 for the pitch axis (or longitudinal setting) is approximately 1.8 inches.

Figure 3:
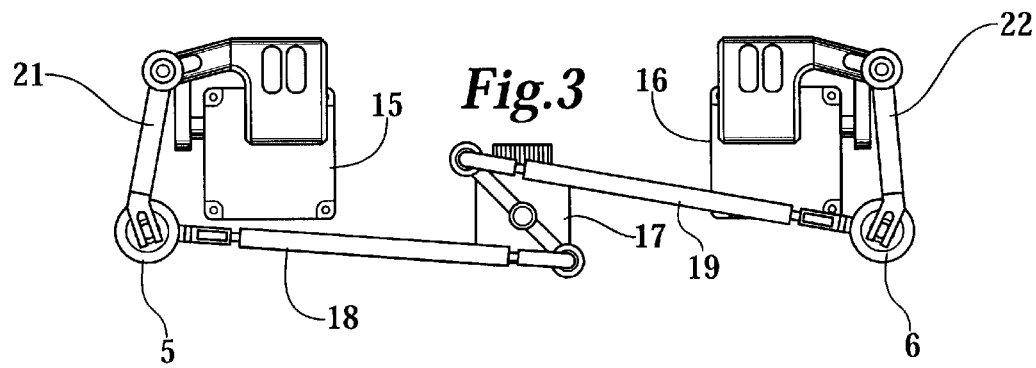
FIG. 3 is a plan view of the position of the gradient actuator, linkages and moment arms when a tilt rotor aircraft is in airplane mode.

There is a need for higher force on the sticks 2 when a tilt rotor aircraft must move into airplane mode. Referring to FIG. 3, to accommodate this needed change in force, the gradient actuator 17 increases the length of the moment arms 21, 22 so that the springs 15, 16 can also accommodate the change. Through movement by the gradient actuator 17, the roll axis can be increased to about 3.4 inches and the pitch axis to about 3.44.

Figure 4:
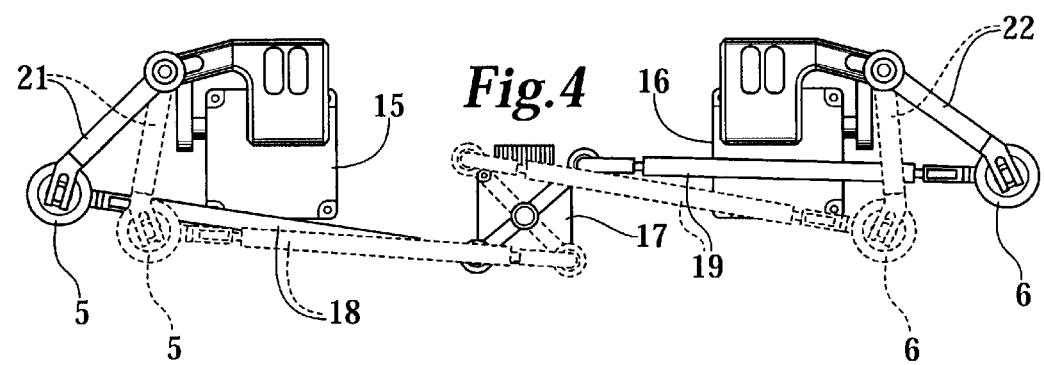
FIG. 4 is a superimposed plan view of the gradient actuator, linkages and moments arms in airplane mode over helicopter mode.

Referring to FIG. 4, the invention in Airplane mode is shown superimposed over Helicopter mode. The respective positions of the moment arms, 21 and 22 for each mode are what accomplishes the feel and control advantages of the invention.

Figure 5:
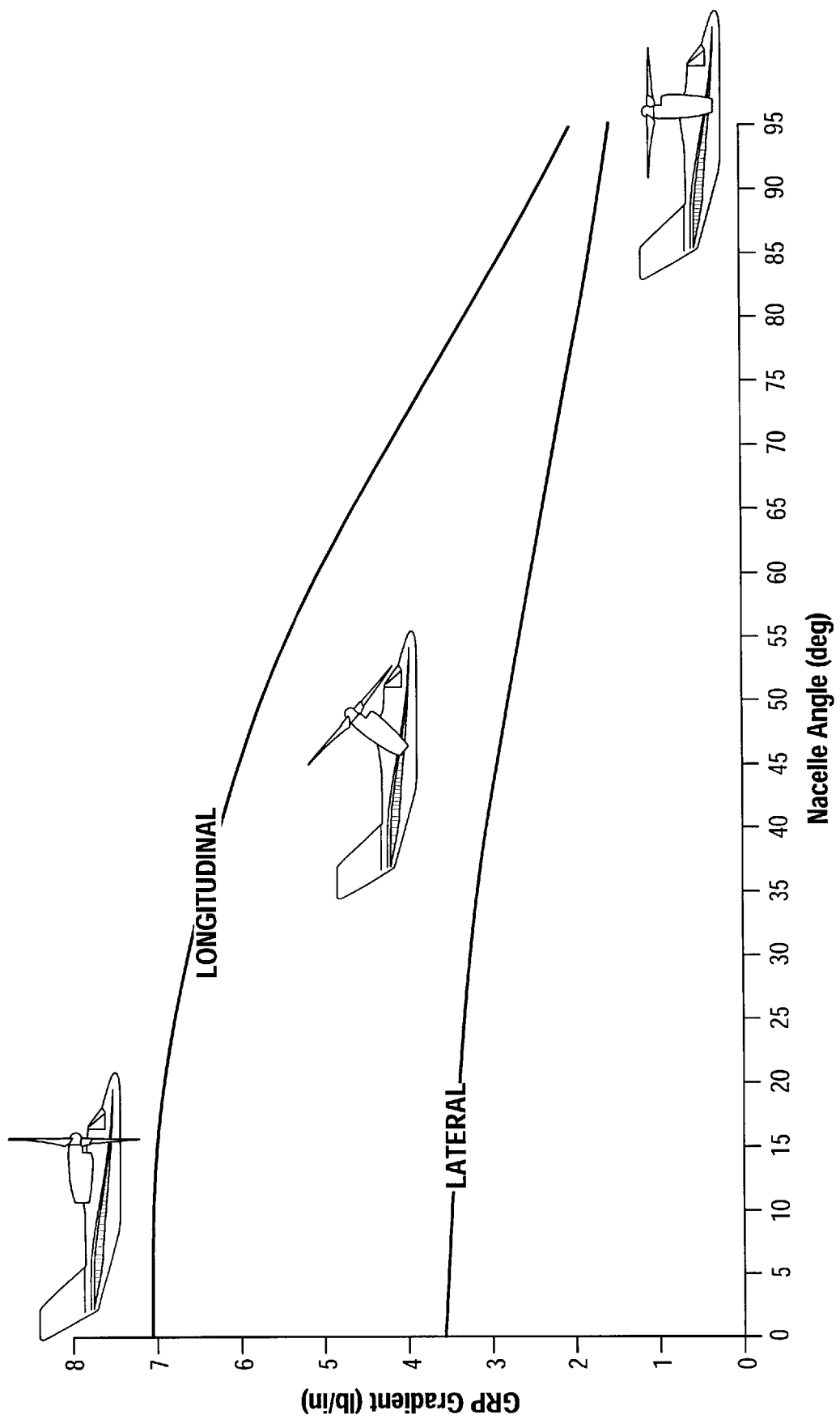
FIG. 5 is a graphical illustration of gradient force on the y axis, plotted against a Nacelle angle on the x axis.

Referring to FIG. 5, a graphical illustration shows what a pilot may feel as the aircraft is transitioning from airplane mode to helicopter mode. Two curves illustrate a force that decreases for longitudinal stick position (or pitch) from seven pounds per inch down to only about 2 ¾ pounds per inch as the angle of the tilt rotors, with respect to the horizon, is increased (or as the tilt rotor aircraft is otherwise moved from airplane mode into helicopter mode). The pilot will encounter a lateral feel that undergoes a similar change, from about 3 ½ pounds in force in airplane mode down to about 1.8 pounds of force in helicopter mode. The size of the change may be made dependent on what is desired by the pilot. It is conceivable that the load on the cyclic stick could actually go down to 0 by having the moment arms move to a 0 moment arm length, if such a change were desired by the pilot. Such diverse operation would be coordinated by the controller, through the gradient actuator 17.

Figure 6:
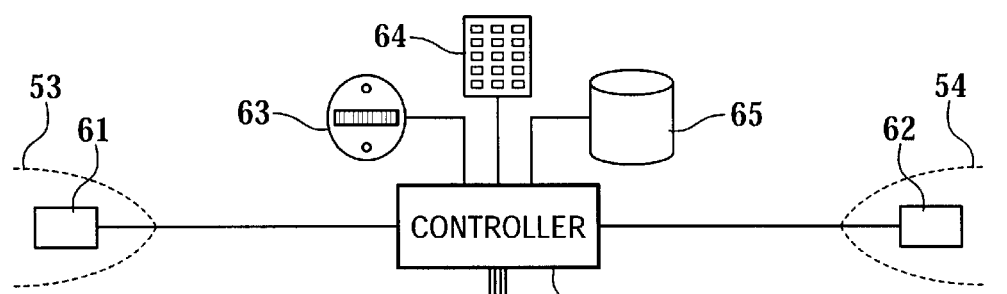
FIG. 6 is a schematic illustration of interacting components for one system configuration given the teachings of the present invention.
Figure 6:
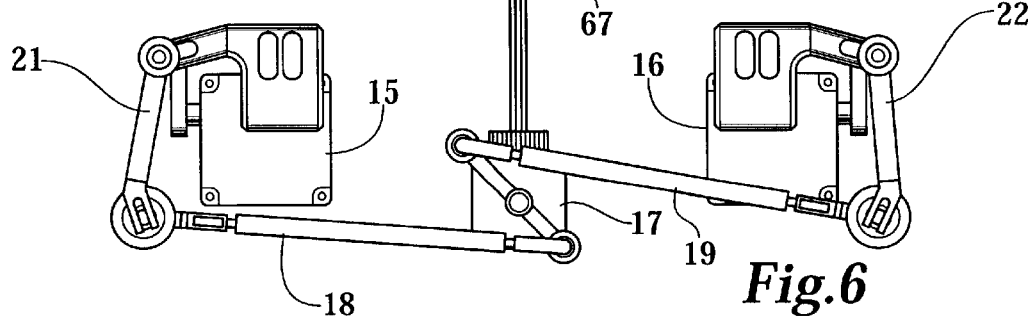

Referring to FIG. 6, sensors 61, 62, located in each Nacelle 53,54 of the tilt rotor aircraft (not shown) send information to the controller 67, which then causes the gradient actuator 17 to make the necessary adjustments to the moment arms 21, 22. In addition to Nacelle placement, the controller 67 can also receive input based on air speed 63, which would be used to determine moment arm placement. Tailored pilot settings may also be input to the controller 67, manually 64 and/or from memory 65. Presently, however, because of the complexity of measuring air speed and the possibility for controller failure or pilot miscalculation, it is most simple and reliable to tie moment arm adjustments directly to the Nacelle angle. Such an arrangement could conceivably be made with minimal electronic control by slaving the gradient actuator 17 to sensors/transducers 61 or 62 located at either Nacelle. Furthermore, the Nacelle angle can be sensed very reliably and redundantly with the placement of different independent sensors throughout the system.

Because both lateral and longitudinal system force feel values are set by the same parameter, a gradient actuator can be used to vary the force gradient of both systems. Great benefit is derived through the use of the lateral and longitudinal three-dimensional phasing linkages driven by a single gradient actuator as described herein. This configuration results in a simple, light-weight system. It should be appreciated that if independent varying of lateral and longitudinal force feel values is desired, two separate actuators in response to signals from a control mechanism as described herein can also be used.

The variable gradient system of the present invention takes the conventional system and varies the length of the moment arm. This is accomplished by using a single actuator (which is not independently back-drivable) to pivot the moment arms for the lateral and longitude motions of the stick so that desired tensions are accomplished. The conventional fixed gradient force trim system described in the background, for example, can be converted into a variable gradient force adjustment system with the application of a three-dimensional phasing linkage arrangement. By adding hinge points to the bell cranks of a conventional force trim system, the plane of the two dimensional linkage can be rotated via a gradient actuator linked to the hinge points. As the operating plane of the two dimensional linkage is rotated out of the original plane of operation, the effective moment arm of the bell cranks with respect to the gear is reduced. The reduction in effective moment arm reduces the amount the spring cartridge is compressed or extended by the cyclic. The reduction continues until the linkage is rotated to about 90° from its original position. At about 90° the effective moment arm is zero and cyclic movement has minimal effect on the spring cartridge. In effect, the three dimensional linkage system allows the cyclic force felt by the pilot to be continuously phased to zero force.

A pilot of a tilt rotor aircraft flying in helicopter mode can now move into airplane mode and realize a gradual increase of controller force and stability. The present system is simple, relative to current systems, in that the redundancy required by most force trim systems be overcome, or otherwise eliminated. An aircraft using the present system would only lose the variable gradient force should the gradient actuator fail, leaving the controller in one force position. Such a condition wouldn't change with speed of the aircraft, but would be a much more benign failure than having a system that goes completely limp. Furthermore, from the standpoint of cost, weight, reliability and simplicity, the present invention is a major improvement over current systems.

While the invention has been described in detail above, it should be understood that it has been presented by way of example only, and not limitation. Thus, the breadth and scope of a preferred embodiment should not be limited by any embodiments described above, but should be defined only in accordance with the following claims and their equivalents.

We claim:

1. A variable gradient control stick force feel adjustment apparatus, comprising a gradient actuator operationally coupled to at least one spring cartridge assembly that is associated with an aircraft's onboard directional hardware, the gradient actuator for moving the pivot point of the at least one spring cartridge with respect to the aircraft's onboard directional hardware so that the tension of at least one manual control stick for the aircraft can be adjusted.

2. The invention of claim 1 further comprising at least one input to the gradient actuator for receiving an operational parameter from at least one of the aircraft's onboard devices.

3. The invention of claim 1, further comprising a lateral spring cartridge assembly and associated lateral actuator and a longitudinal spring cartridge assembly and associated longitudinal actuator, wherein the gradient actuator is further operationally coupled to the lateral spring cartridge assembly and to the longitudinal spring cartridge assembly, and the gradient actuator is configured to provide variable tension to the control stick via a change in moment arm length of the lateral spring cartridge assembly with respect to the lateral actuator and the longitudinal spring cartridge assembly with respect to the longitudinal actuator, the change in moment arm being based on operational parameters provided to the gradient actuator, and wherein the lateral and longitudinal spring cartridges are further operationally coupled to the control stick to control tension against the lateral and longitudinal motion of the stick.

4. The invention of claim 3 wherein the operational parameter provided to the sensor input by an onboard device is aircraft airspeed.

5. The invention of claim 3 wherein the operational parameter provided to the sensor input by an onboard device is manually input to a controller by a pilot.

6. The invention of claim 3 wherein the aircraft is a tilt rotor aircraft and the operational parameter provided to the sensor input is tilt rotor operational position recorded by a Nacelle position sensor.

7. The invention of claim 3 wherein the gradient actuator further comprises a signal input wherein said gradient actuator is configured by an operational parameter through the input in order to move the spring actuators.

8. The invention of claim 7 wherein the operational parameter provided to the sensor input is aircraft airspeed.

9. The invention of claim 7 wherein the operational parameter provided to the sensor input is manually input to a controller by a pilot.

10. The invention of claim 7 wherein the aircraft is a tilt rotor aircraft and the operational parameter provided to the sensor input is tilt rotor operational position.

11. The invention of claim 7 wherein the operational parameter provided to the sensor input is provided from memory.

12. A variable gradient control stick force feel adjustment system for use in an aircraft, comprising:

a gradient actuator operationally coupled to the aircraft lateral spring cartridge assembly and the longitudinal spring cartridge assembly;

at least one sensor input to the gradient controller for receiving at least one operational parameter from a device onboard the aircraft.

13. The invention of claim 12 wherein the operational parameter provided to the sensor input is aircraft airspeed as measured by an airspeed measuring device.

14. The invention of claim 12 wherein the operational parameter provided to the sensor input is manually input to a controller by a pilot.

15. The invention of claim 12 wherein the aircraft is a tilt rotor aircraft and the operational parameter provided to the sensor input is Nacelle position as recorded by at least one Nacelle position sensor.

* * * * *